United States Patent [19]
Constantz

[11] Patent Number: 5,067,272
[45] Date of Patent: Nov. 26, 1991

[54] APPARATUS FOR WATER DESALINATION AND DRIP IRRIGATION OF ROW CROPS

[75] Inventor: James E. Constantz, Portola Valley, Calif.

[73] Assignee: The United States of America as represented by the Secretary of the Interior, Washington, D.C.

[21] Appl. No.: 265,109

[22] Filed: Jun. 9, 1989

[51] Int. Cl.$^5$ .................... A01G 27/00; A01G 13/04
[52] U.S. Cl. ........................... 47/27; 202/234
[58] Field of Search ............ 47/48.5, 21, 29, 79; 203/10, DIG. 17, DIG. 1; 202/234; 159/903

[56] References Cited

U.S. PATENT DOCUMENTS

| | | | |
|---|---|---|---|
| 3,428,529 | 2/1969 | Gumucio | 202/234 |
| 3,653,150 | 4/1972 | Howard | 47/29 |
| 4,141,798 | 2/1979 | Grosse | 203/DIG. 1 |
| 4,178,715 | 12/1979 | Greenbaum | 47/29 |
| 4,286,408 | 9/1981 | Manno | 47/27 |

Primary Examiner—Richard E. Chilcot, Jr.
Assistant Examiner—Michele A. Van Patten
Attorney, Agent, or Firm—E. Philip Koltos

[57] ABSTRACT

An apparatus for providing purified water to row crops is disclosed which comprises a dark plastic lower sheeting layer upon which impaired water can be ponded, and a clear plastic upper sheet which is positioned above the lower layer in the shape of an inverted V by means of a suitable supporting structure. The apparatus is designed to be placed between two row crops in a field in need of irrigation, and irrigation takes place by filling the lower sheeting layer with impaired water which evaporates when solar energy is transmitted onto the lower layer through the clear upper sheet. The evaporated water collects on the underside of the clear plastic sheet and drips downward along the sheet until it contacts the ground in the vicinity of a crop row. In another embodiment of the invention, clear rigid panels can be employed instead of the clear plastic sheet.

10 Claims, 2 Drawing Sheets

APPARATUS FOR WATER DESALINATION AND DRIP IRRIGATION OF ROW CROPS

FIELD OF THE INVENTION

The invention relates in general to an apparatus for providing purified water to row crops, and in particular to a water desalination/drip irrigation system employing an inverted V-shaped clear plastic cover and a dark plastic lower layer serving as a distillation basin.

BACKGROUND OF THE INVENTION

At present, agricultural expansion into many semi-arid and arid regions is severely limited by the scarcity of good quality irrigation water and the cost of the energy necessary to provide irrigation to these areas. Generally, although water resources remain available to these regions, they are mostly unexploited due to two main factors: (1) unacceptable quality of the water for irrigation (e.g., water high in salts or toxins); and (2) the requirement of great conveyance energy (i.e., water transportation, pumping, and pressurizing energy) in order to approach economic usefulness. Due to increased competition for good quality water and higher conveyance costs, the total cost of irrigation is continually increasing in such areas. If this trend continues, not only will agricultural expansion be curtailed, but substantial reductions in irrigated agriculture may be necessary.

Another problem in these dry regions arises with regard to salt accumulation in agricultural basins. For many agricultural basins associated with irrigated areas, irrigation drainage water has become a severe environmental pollutant. This is primarily due to the leachates and tailwaters of the drainage which cause increased salinity of groundwater and surface water resources. Since water imports are limited to their present levels in most of these basins, there have been gradual increases in the proportion of impaired water resources to good quality water resources in these basins.

As a consequence of the situation described above, methods for improving irrigation management, water conservation, and saline water conversion have become increasingly active areas of water resources research. Recently, irrigation management has been improved through more precise irrigation scheduling and increased use of drainage systems. In addition, water conservation techniques such as installation of drip (trickle) irrigation systems and the adoption of drought tolerant crops have helped to maintain the present level of irrigated agriculture in semi-arid and arid regions while leading to reductions in the amount of agricultural drainage. However, when the only water resources available are saline or otherwise impaired, irrigation management and water conservation methods become ineffective, necessitating alternatives such as the use of salt tolerant crops or saline water conversion processes. Although there has been some success with a limited number of salt tolerant crops, water conversion and purification techniques are not being used extensively because of the high costs involved. At present, there are ever increasing amounts of impaired water resources in arid and semi-arid regions that cannot be used for irrigation, and the problem of water distribution in these areas is becoming a very serious one.

In light of these trends, there exists a clear need for a low-energy inexpensive process for water purification and irrigation which is designed to help solve the complex problems associated with water scarcity, increasing water conveyance costs, and regional accumulation of salts. It would be desirable, therefore, to develop a process which can cheaply and effectively purify saline or otherwise impaired water resources, and at the same time, distribute the purified water to row crops to allow them to grow in arid and semi-arid regions.

It has been known in the prior art to develop systems in which impaired water sources are used to provide water to plants by evaporating the impure water so that the contaminants are separated out, and then applying the purified, evaporated water to the plants. However, such prior art systems have not been simple and inexpensive ones which can effectively be used for row crops. One such system, described in U.S. Pat. No. 3,653,150 (Howard), employs a transparent cover which is draped flat over an area so that evaporation takes place and water which condenses on the cover falls on the ground below. This system is complex in that it requires water tube-containing side panels which are mechanically adjusted to increase or reduce pressure on the cover means, and this cover means is designed to be deployed by tractors or other vehicles using a motor-driven takeup roll. In addition, because of the flat deployment of the cover means, water which condenses falls on the ground in random patterns over the area covered, and is thus not focused on particular furrows, as would be needed to promote maximum growth of row crops. Another system, disclosed in U.S. Pat. No. 4,178,715 (Greenbaum), involves a channel culture array which is used to retain soil, and which is placed over a flow of contaminated water. In this system, moisture condenses on the underside of the array and seeps into the soil through apertured panels. This system requires a flow of contaminated water under the arrays, a liquid impermeable portion of the arrays to keep the soil away from the contaminated water, and a cooled floor undersurface to allow moisture to condense and wet the soil. It does not make use of a simple drip irrigation system in order to focus evaporated water on row crops. It is still thus needed in the art to develop a system for irrigating row crops using contaminated or saline water which is simple and inexpensive, yet which can effectively be used to provide purified water to row crops.

SUMMARY OF THE INVENTION

A simple, inexpensive, yet effective means for providing purified evaporated water to irrigate row crops is provided in the present invention which comprises a drip irrigation apparatus consisting of a dark plastic lower sheet, upon which impaired water can be ponded, and a clear plastic upper sheet positioned above the dark sheet in the shape of an inverted V and maintained in the inverted V shape by means of a supporting structure, such as wire strung between two rods. This apparatus, which is placed between two crop rows in a field to be irrigated, is operated by filling the distillation basin, created by the dark plastic sheeting, with impaired water which will evaporate when sunlight shines through the clear plastic sheet. The evaporated water condenses on the underside of the inverted V-shaped clear plastic sheet, runs down the clear sheeting, and contacts the ground in the vicinity of a crop row. In another embodiment of the present invention, the clear plastic upper sheeting can be replaced by clear rigid paneling.

BRIEF DESCRIPTION OF THE DRAWING FIGURES

DETAILED DESCRIPTION OF THE PREFERRED EMBODIMENTS

Figure 1:
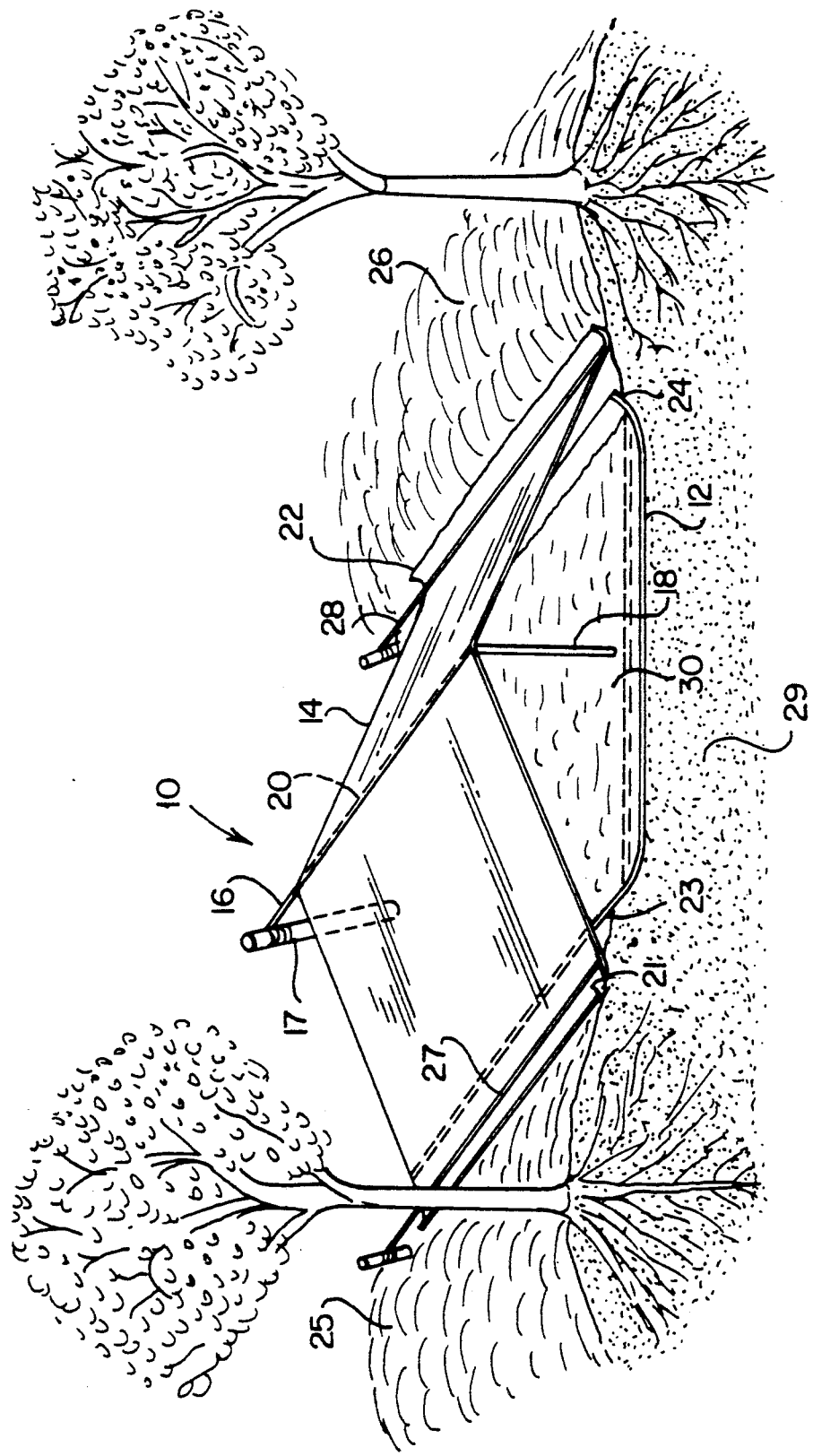
FIG. 1 is a perspective view of an embodiment of the present invention.

In accordance with the present invention, there is provided an apparatus 10 for providing purified water to row crops as observed in FIG. 1. The apparatus 10 consists primarily of a dark or black plastic sheeting lower layer 12, capable of providing a basin for impaired water, and an upper clear plastic sheet 14. The clear plastic sheet 14 is draped over a suitable supporting means such as wire or rope 16 strung between two poles 17 and 18 so as to form and retain the shape of an inverted V, with wire 16 forming the apex 20 of the inverted V shape. Ideally, the wire 16 is strung at about one meter in height so that the apex 20 of the clear sheet 14 will be suspended approximately one meter above dark plastic sheeting 12. It is preferred that a series of small center posts similar to pole 18 be positioned every few meters along the length of wire 16 so as to better support the structure.

The lateral outer edges 21 and 22 of clear plastic sheet 14, are positioned so that they extend beyond the lateral outer ends 23 and 24, respectively, of the dark plastic sheeting layer 12. Lateral outer edges 21 and 22 of clear sheet 14 are preferably held down firmly against the soil in the vicinity of crop rows 25 and 26, respectively, by any suitable means known. In the preferred embodiment, as observed in FIG. 1, the outer edges 21 and 22 are held down by wires 27 and 28, respectively. However, other suitable means, such as pegs, sand bags or a combination of any of these, could also be employed to hold down the edges. Whatever means are employed, it is necessary that the edges of clear plastic sheet 14 are held down or covered with soil in order to prevent loss of water vapor which will be needed to provide irrigation to the row crops.

In operation, prior to installation of this apparatus, the soil surface is necessarily prepared (e.g., leveled and diked) in a similar manner to that used in conventional furrow/flood irrigation. This step is necessary to ensure that impaired water can be ponded on the dark lower sheeting. After this soil preparation step, the dark plastic sheeting layer 12 is rolled out or spread over the length of a strip of land 29 between two crop rows or furrows 25 and 26. The dark sheeting 12 can be placed in each inter-furrow strip of a field, or can be applied only to alternate inter-furrow strips if so desired. The number of strips of sheeting needed will be variable, and will depend upon climate and cultivation requirements of the particular area to be irrigated. Generally, the more severe the arid nature of the climate, the greater the number of strips that will be needed. The dark or black plastic sheeting layer or tarp 12 is spread over the prepared inter-furrow strip 29 so as to provide a basin for impaired water. The dark or black plastic sheeting should also be high temperature-stable so as to prevent heat damage which might occur if dry spots arise. After the lower black sheeting layers are spread, the wire 16 is strung between posts 17 and 18, and is preferably further secured by a series of small center posts. At this point, the upper clear plastic sheeting layer 14 is draped over the wire 16 so that it forms an inverted V-shape, and its lateral outer edges, 21 and 22, extend beyond the lateral outer ends 23 and 24, respectively, of each black plastic sheeting layer 14 employed.

The irrigation operation is initiated when impaired water is applied to the basin created by the dark plastic sheeting. The apparatus 10 of the present invention is designed so that a distillation basin is created by the black plastic sheeting layer 12 combined with the inverted V-shaped clear plastic sheet cover 14, and the solar energy transmitted through the clear sheet heats the impaired water so that it evaporates, allowing purified distilled water to condense on the underside of the clear plastic sheet. The condensed distilled water rolls down along the sides of the sheet until it contacts the ground in the vicinity of the crop rows 25 and 26 on both sides of the apparatus 10. In this system, distillation-drip irrigation is carried out using solar energy as the main power source for both the purification of impaired water, and the application of that purified water to row crops. It is preferred that the upper plastic sheet, in addition to allowing transmission of sunlight, be made of a material which is somewhat resistant to sunlight (i.e., UV-stabilized) and which inhibits water vapor diffusion across its surface. Suitable materials for the upper clear plastic sheet would include polyethylene, polyvinyl chloride, and other similar substances.

The inverted V-shape of the upper clear plastic cover 14 of the preferred embodiment is more efficient in providing purified water to crops than designs such as arch-shaped tubes, because condensate on the top of arches would tend to drip back onto the black plastic sheeting holding the impaired water, thus substantially decreasing the efficiency of that system. Because of the need in the present invention for the water to run down the sides of the clear plastic sheet and contact the row crop soil, it is also contemplated that a hydrophilic coating be placed on the inside or undersurface of the sheet in order to inhibit formation of large distillate drops that might fall back onto the black plastic sheeting. These coatings could also inhibit fogging of the upper sheet which would also tend to reduce irrigation efficiency. It is preferred that the clear plastic sheeting have some reinforcement along the center apex line as to provide resistance to chaffing or melting which may be caused by the supporting wire. Suitable reinforcing means for the center line can be provided by a clear plastic tape strip of approximately 5 cm in width.

Figure 2:
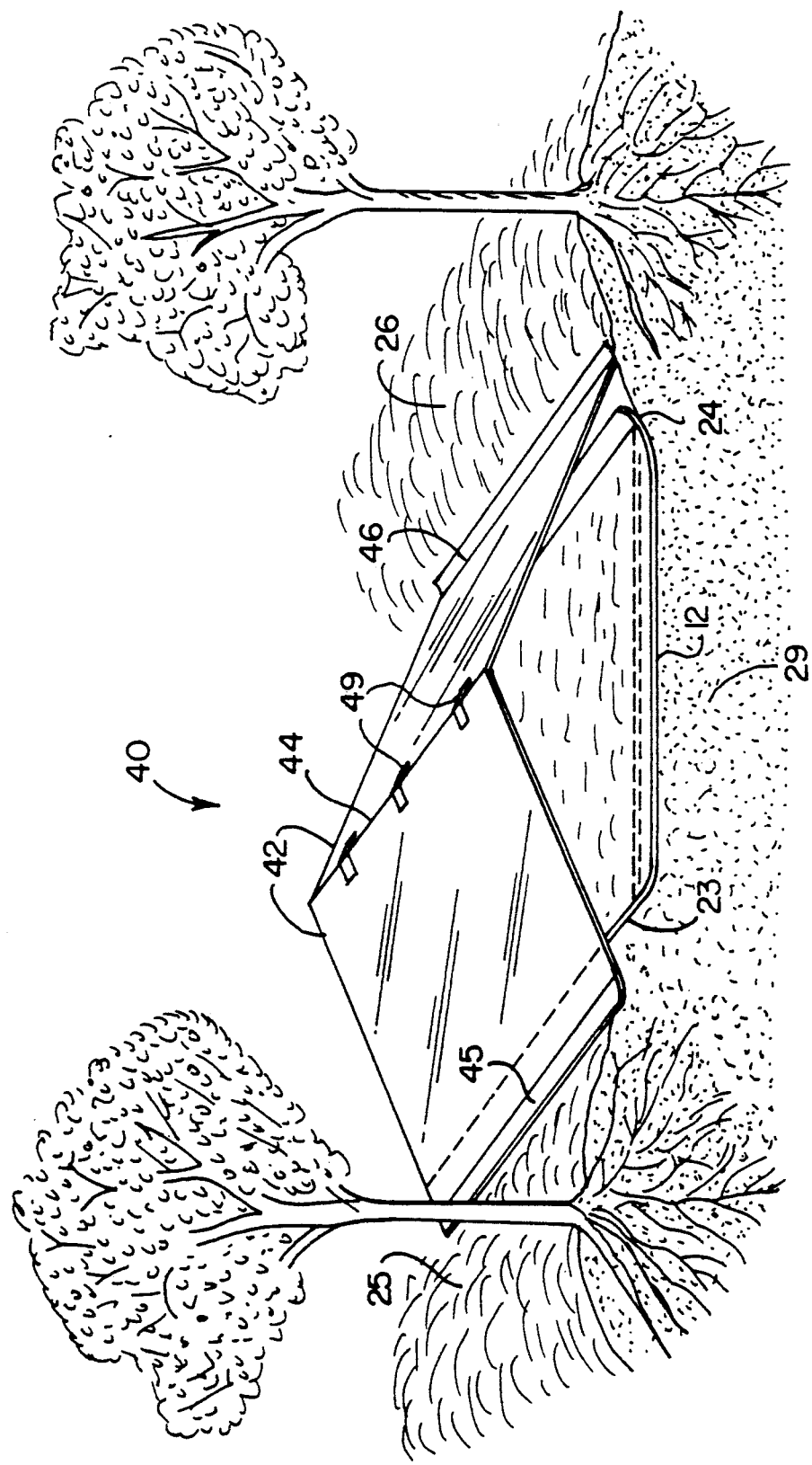
FIG. 2 is a perspective view of an alternative embodiment of the present invention.

It is also possible to substitute rigid glass-like clear panels for the clear plastic sheet described above. This embodiment of this invention is depicted in FIG. 2. In this embodiment, the apparatus 40 is comprised of rigid panels 42 positionable in the shape of an inverted V, with an apex at 44, and the lateral outer edges 45 and 46 extending beyond the lateral outer ends, 23 and 24, respectively, of the dark plastic sheeting layer 12. As in the previous embodiment, the apparatus is positioned between crop rows 25 and 26, and solar energy causes impaired water on the dark sheeting layer to evaporate, condensing on the inner or underside of the rigid panels 42. This condensed water forms into droplets which run along the inner side of the panels 42 and contact the ground in the vicinity of crop rows 25 and 26. These rigid panels can be supported by the means shown with regard to the previously described embodiment, or can be positioned (as shown in FIG. 2) so that they do not need additional supporting means. If no supporting means are used, the panels can be attached at the apex or joint 44 by means of suitable jointing devices 49. It is preferred that the clear rigid panels 42 be comprised of fiberglass, but any other suitable glass-like panels can also be used.

Other viable alternative embodiments for the present invention are also possible. For instance, the distillation irrigation systems using the apparatuses described above could be operated using a batch-type or flow-type processing technique wherein irrigation water could be distilled from a static source of impaired water ponded on the black plastic layer, or from a flowing source of impaired water with specific inflow and outflow velocities at either end of the field. In some cases, depending on topography, ponding impaired water onto the dark sheeting layer may not be the best application technique. As an alternative, impaired water may be applied to the apparatus via a drip irrigation system onto an absorbent liner placed on top of the black plastic sheeting layer. This impaired water would then spread over the surface of the liner through capillary action, and still be evaporated by solar energy in order to be used for irrigation. This latter embodiment would be especially useful if the present invention were desired to be used on unlevel surfaces, such as a hilltop or a hill slope.

A device prepared in accordance with the present invention, and similar to the apparatus shown in FIG. 1, was tested in preliminary field trials to evaluate the general feasibility of the design and the ability of the device to generate adequate supplies of distilled water to maintain desert crops. The trial was initiated at the beginning of summer in a warm, semi-arid location near San Jose, Calif. A distillation/drip irrigation system (3 m long by 1.5 m wide by 0.5 m high) was installed in a sand-filled box of dimensions 3 m × 2 m × 0.5 m, and tap water was ponded on the black plastic liner section of the distillation irrigation system. It is noted that tap water was used only for convenience; the solar energy to evaporate sea water is only slightly greater than tap. The next day, several types of vegetable seedlings were planted on either side of the irrigation system. Normally, under these environmental conditions, unirrigated vegetable seedlings are expected to die within a couple of days. The experiment was carried on until September, and the only water supplied to the apparatus was tap water periodically added to the dark plastic liner. At this time, no rainfall was occurring at the site, and no water was added to the sand-filled box. The distillation/drip irrigation system of the present invention provided sufficient water to the plants in the experiment, preventing visible loss of turgor and permitting flowering and fruit development by the plants. This experiment demonstrated that under certain conditions, a distillation/drip irrigation system as provided by the present invention can successfully provide distilled water to an actively growing crop for several warm, dry months.

Tests such as the one described above have indicated the feasibility of irrigating row crops with the apparatus of the present invention. As one would expect, the demands of a hot, arid location are greater than what would be found in warm, semi-arid regions, and one needs to cover a greater percentage of a field with the present apparatus when used in hot, arid locations. It has been determined that in hot, extremely dry locations, an apparatus in accordance with the present invention should cover at least two-thirds of the field irrigated. In warm, semi-arid regions, generally a system wherein about one-half of the field is covered would be sufficient to provide adequate water for the row crops involved. The percentage of area that needs to be covered will depend on the climatic conditions of temperature and moisture, as well as the particular row crop being irrigated.

What is claimed is:

1. An apparatus for providing purified water to row crops comprising:
   a lower layer of dark plastic sheeting designed to be placed over the length of a strip of land between two crop rows, said dark plastic sheeting layer capable of providing a basin for impaired water;
   a supporting means disposed lengthwise above said dark plastic sheeting layer and capable of supporting a clear plastic sheet in such a manner that the clear plastic sheet will take the shape of an inverted V over said dark plastic sheeting layer when draped over said supporting means;
   an upper clear plastic sheet positionable above said dark plastic sheeting layer and retainable in an inverted V shape by said supporting means, said supporting means running lengthwise down the center of said clear plastic sheet so as to form the apex of the inverted V, the lateral outer edges of said clear plastic sheet extending to a point beyond the lateral outer ends of said dark plastic sheeting layer so that the outer edges of said clear plastic sheet are not connected to the lateral outer ends of said dark plastic sheeting layer and so that purified water which condenses on the underside of said clear plastic sheet due to the evaporation if impaired water in the basin provided by the dark plastic sheeting layer is directed to roll down along the underside of said clear plastic sheet and contact the ground in the vicinity of a crop row; and
   means to firmly hold down the outer lateral edges of said clear plastic sheet against the soil in the vicinity of a crop row.

2. An apparatus according to claim 1 wherein the supporting means comprises a wire or rope suspended above said dark plastic sheeting layer by means of posts.

3. An apparatus according to claim 2 wherein the wire or rope is suspended above said dark plastic sheeting layer at a height of approximately one meter.

4. An apparatus according to claim 2 wherein the wire or rope is supported by a series of posts positioned every few meters along the length of the wire or rope.

5. An apparatus according to claim 1 wherein the means to hold down the plastic sheet ends is selected from the group consisting of wires, pegs, and sand bags.

6. An apparatus according to claim 1 wherein the clear plastic sheet is comprised of polyethylene.

7. An apparatus according to claim 1 wherein the clear plastic sheet is comprised of polyvinyl chloride.

8. An apparatus according to claim 1 wherein the clear plastic sheet has a hydrophilic coating on its inside surface in order to inhibit fogging and inhibit formation of large distillate drops so that the drops forming on the underside of said plastic sheet will roll down along the sheet and contact the row soil, and not fall back onto the dark plastic sheeting layer.

9. An apparatus for providing purified water to row crops comprising:
   a lower layer of dark plastic sheeting designed to be placed over the length of a strip of land between two crop rows, said dark plastic sheeting layer capable of providing a basin for impaired water; and clear rigid glass-like panels positionable in the shape of an inverted V over said dark plastic sheeting layer in such a manner that the lateral outer edges of said panels extend beyond the lateral outer ends of said dark plastic sheeting layer so that the outer edges of said panels are not connected to the lateral outer ends of said dark plastic sheeting layer and so that the purified water which condenses on the underside of said panels due to the evaporation of impaired water in the basin provided by the dark plastic sheeting layer is directed to roll down along the underside of said panels and contact the ground in the vicinity of a crop row.

10. An apparatus according to claim 9 wherein the clear rigid panels are comprised of fiberglass.

* * * * *